United States Patent [19]

Finnerty et al.

[11] Patent Number: 4,978,543

[45] Date of Patent: Dec. 18, 1990

[54] PROCESS FOR THE MANUFACTURE OF MICROWAVABLE OAT HOT CEREAL

[75] Inventors: Suja P. Finnerty, Arlington Heights; Marvin K. Lenz, Algonquin, both of Ill.

[73] Assignee: The Quaker Oats Co., Chicago, Ill.

[21] Appl. No.: 355,774

[22] Filed: May 23, 1989

[51] Int. Cl.$^5$ .............................................. A23L 1/00
[52] U.S. Cl. ................................... 426/243; 426/509; 426/619
[58] Field of Search ............... 426/508, 509, 510, 619, 426/243

[56] References Cited

U.S. PATENT DOCUMENTS 3,342,607 9/1967 Hickey ............................... 426/511

OTHER PUBLICATIONS

Microwave Cook Book published by the Better Homes and Gardens Books, 1976 (p. 57).

*Primary Examiner*—George Yeung
*Attorney, Agent, or Firm*—Joseph P. O'Halloran; Mart C. Matthews; Daniel W. Latham

[57] ABSTRACT

Traditionally manufactured oat products, even those steamed for enzyme stability, have been found to present a tendency for foamover, when consumer-prepared in a microwave oven. In spite of the steam treatment, it is found that the starch in such products is raw, that is ungelatinized.

In accordance with this invention, whole or cut oat groats are pregelatinized, and if desired, are flaked or cut, to provide a hot oat cereal product which is particularly suitable for microwave preparation by the consumer. The resulting packaged hot oat cereal is prepared by the consumer by admixing with a minimal amount of water, e.g. ⅔ cup of water or less per ounce of cereal, and subjecting to a one-step cooking cycle in the microwave.

7 Claims, 2 Drawing Sheets

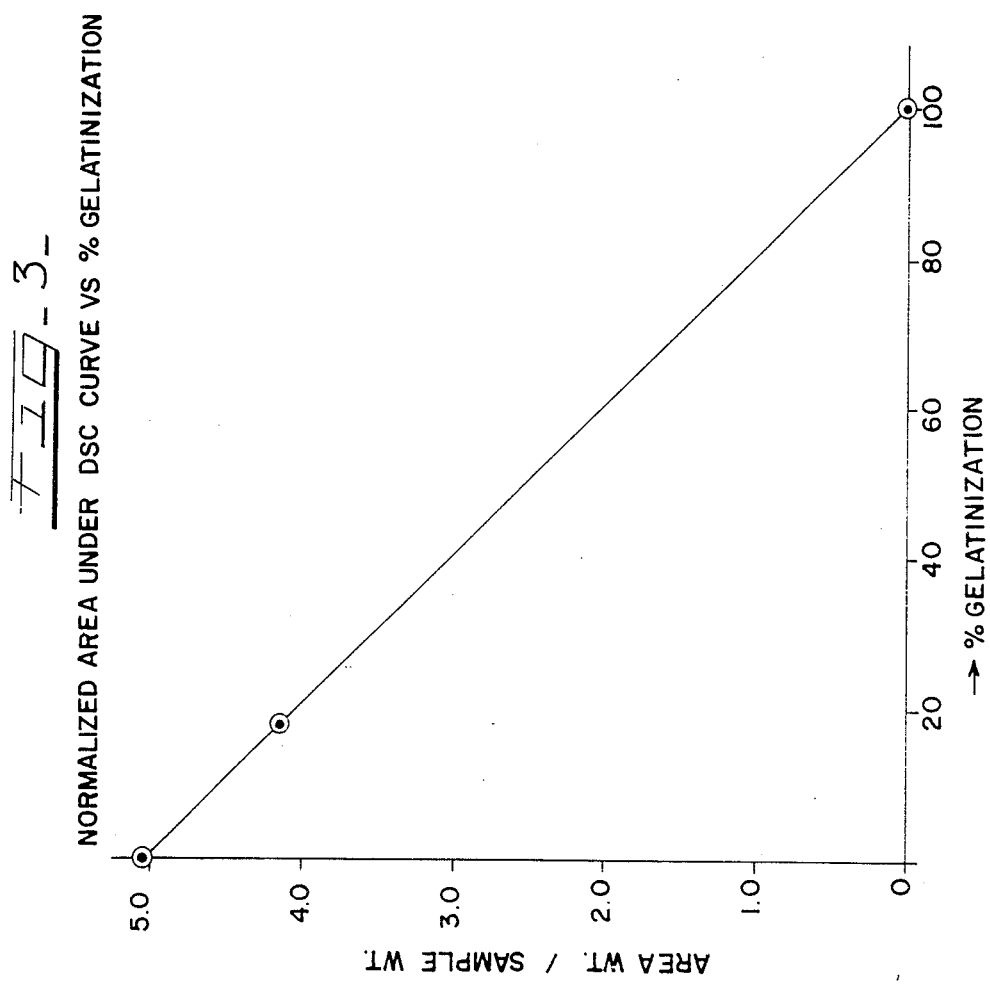

PROCESS FOR THE MANUFACTURE OF MICROWAVABLE OAT HOT CEREAL

TECHNICAL FIELD

This invention relates to the manufacture of shelf stable oat cereals, suitable for consumer preparation in a microwave oven.

BACKGROUND OF THE INVENTION

Natural cereals, such as hot oat cereals, have been achieving higher and higher degrees of acceptance by consumers. With respect to oats, this may be due, in part, to the widespread promulgation of the recent medical reports impact of oat bran in providing a healthful lowering of cholesterol components in humans. In addition, the oat is a highly nutritious grain, not only in terms of possessing outstanding water soluble fiber levels, but also in terms of the richness of its protein, mineral, and lipid contents and other nutritive factors.

In view of the increasing appreciation of oat products, it is desirable to improve the efficiency and results of traditional oat groat processing, without adversely affecting the natural wholesomeness of the product.

Consumer standards for high quality products, in terms of both organoleptic and convenience attributes, and in terms of healthful nutritional impact, must be met in the products of very economical processes, in order for the cereal product to survive in the highly competitive marketplace. Moreover, such products when packaged in conventional packaging materials, must be shelf stable, to the extent of remaining in a desirably consumable form, and in a form which is readily prepared by the consumer, during the time after manufacture and prior to the consumption by the consumer.

In the case of grain products, generally, and oat products, specifically, shelf stability is reliant chiefly upon the suppression or avoidance of enzymatic and oxidative reactions which may occur within the grain. To the uninitiated, it may seem straightforward to heat the grain to deactivate the enzymes. However, some kinds of processing have been believed to aggravate these enzymatic and oxidative reactions, and some processing may suppress one, and aggravate the other. Some heat treatments may be just right to suppress the activity of the enzymes, but would accelerate the oxidative rancidity development of the lipid content. Enzymatic reactions, particularly those involving lipolytic reactions, occur relatively slowly at low moisture and low temperatures, and unless the enzymes are inactivated, or removed, these reactions can cause rancidity by the production of high levels of free fatty acids (FFA).

Many samples of raw, undamaged oat kernels, as harvested, contain 3-10% of their fat already in the form of FFA. Usual shelf storage of oats, at 18 degrees C. and at about 13% moisture is reported to involve slow increase of FFA. The rate of rancidity development is reported to be accelerated by higher moisture levels, and by higher temperatures.

Moreover, in spite of natural antioxidant properties in oats, the development of rancidity of oats attributable to oxidation reportedly can occur even more rapidly under low-moisture and high-heat conditions, and oat products subjected to such conditions are reportedly typified by an increase in FFA, as well as by subsequent high peroxide levels. The development of such rancidity is accompanied by an observable deterioration in the organoleptic i.e. sensory, attributes, such as, for example, in the aroma and flavor of the grain.

In addition to aroma and flavor, other attributes such as texture, and convenience of consumer preparation are important in the success of competitive hot cereal products. There are a variety of types of oatmeal, characterized by flake thicknesses, which must be made available, in order to meet consumer preferences, and demands, such as for example Steam Table, Old Fashioned, Quick, and Instant types. These types are a function of flake thickness, and affect the convenience of consumer preparation. Improvements in oat processing should be amenable to the production to all such types of oat flake products.

One of the undesirable characteristics of flaked oat cereals, is the tendency to foam out of the bowl in ordinary microwave preparation. This tendency is particularly acute with the thicker types of oatmeal flakes. With the meteoric increase in the use and availability of microwave ovens, this method of consumer preparation of hot oat cereals has also become increasingly popular. Parents are believed to be increasingly likely to encourage their children to prepare a personal serving bowl of hot oat cereal in the microwave. Hence, it would be desirable to provide improvements in oat processing which result in an oat cereal product which is not particularly sensitive to reproduction of exact conditions such as quantity of water, and does not require the so-called two step method, for successful consumer preparation in the microwave.

The problems associated with stability of oats are discussed in several articles and patents. For example, see the following:

H.F. Martin, *FACTORS IN THE DEVELOPMENT OF OXIDATIVE RANCIDITY IN READY TO EAT CRISP OAT FLAKES*, published in the JOURNAL OF SCIENCE OF FOOD AND AGRICULTURE, 1958, No. 12, pages 817-854.

Dr. Francis Webster, U.S. Pat. No. 4,413,018, Method for Manufacture of Whole Grain oat Product.

As surprising as it may seem, the heat treatment to which the groats have been subjected for the purpose of inactivating the enzymes does not gelatinize the starch in the oat groats. Even the process of steaming prior to the flaking steps has been found to result in substantially no gelatinization of the starch in grain. This has been determined using traditional methods, i.e. microscopic examination of the starch cells for loss of birefringence, as well by more recently developed methods, e.g. by the use of Differential Scanning Calorimetry (DSC).

Prior-art heat treatments, for the purpose of providing an "instant" type cereal, did not necessarily involve gelatinization of the oat starches to a significant extent. For example, U.S. Pat. No. 2,864,702 involved "toasting" of unhulled oats, and temperatures of up to about 210 Degrees F. and resulted in a product which was ungelatinized (See claims 3 and 4, for example.) Yet, upon being placed in boiling water such products reportedly hydrated quickly.

We have discovered, however, that microwave foamover is a substantial problem during the cooking of raw oat products, using the amount of oats per serving, and the amount of water generally believed to be appropriate.

With the meteoric increase in the use and availability of microwave ovens, this method of consumer preparation of hot oat cereals has also become increasingly popular. Parents are believed to be increasingly likely to encourage their pre-teen and adolescent children to prepare a personal serving bowl of hot oat cereal in the microwave. However, one of the characteristics of certain of the types of heretofore available flaked oat cereals, is the tendency to foam out of the bowl in ordinary microwave preparation, unless considerable care and precision in measuring, timing, etc. is exercised. And, of course, many youthful consumers, and others, are not particularly noted for taking such pains in their routine activities.

It is an object of the present invention to provide a high speed, competitive process for the partial pre-gelatinization of oat groats for use in the manufacture of cut and/or flaked hot oat cereals.

It is also an object of the present invention to provide a method for such pre-gelatinization which results in a shelf stable product which is suitable for consumer preparation in a microwave oven.

It is also an object of the present invention to provide a hot oat cereal which is particularly well suited to consider preparation in a microwave oven.

SUMMARY OF THE INVENTION

These and other objects, which will be apparent hereinafter, are all achieved, in accordance with the present invention, in an overall process which includes the pregelatinization of oats, or of an oat milling component, i.e. prior to packaging of the cereal product, and subsequently cooking the component as a cereal with water in a microwave oven.

In accordance with the present invention, whole groats, or steel-cut groats, or some other oat grain component or milling fraction, such as oat flakes or oat bran, for example, are at least partially gelatinized, (either before or after a flaking step, if employed,) prior to drying and packaging. Moisture levels are adjusted to 8-12%, preferably 10-11% prior to packaging for storage stability.

Hence, the method of the present invention is applicable to the manufacture and use of oat groats, cut and or flaked groats, as well as to the manufacture and use of components or fractions of oat grains, such as, for example, granular or flaked oat bran, or oat bran concentrate, for example.

The at least partial gelatinization, in accordance with this invention, can be accomplished by any cooking method which will result in a shelf stable oat product. The method for such gelatinization, therefore, can include methods involving high-temperature, short-time, low-moisture heat treatment, to give typical preferred levels of gelatinization of about 10-45% gelatinization, but can also give levels of up to about 50% gelatinization before adverse flavor effects are noted. The pregelatinization methods can also include steaming methods, e.g. under pressure, which result in either partial or complete gelatinization, e.g. in about 10-100% gelatinization, preferably about 80% gelatinization. Using the steaming methods, no adverse flavors were observed at gelatinization levels above about 50%. In Examples 1-4, herein, dry-air, high-temperature methods of pregelatinization are illustrated, and in examples 5-7, methods utilizing steam under pressure are illustrated.

We have discovered that, when the product of the process of the present invention is used, the flake thicknesses which are required to produce a type of microwave consumer-prepared product corresponding to some traditional brackets or types of rolled oats, must be thicker. In fact, in order for a flaked product in accordance with this invention to correspond to a consumer-prepared type of oat flakes, the product of this invention must have a thickness which corresponds to the next thicker respective bracket if one were using traditional guidelines. For example, to produce a flaked oat product which corresponds, after consumer preparation, to instant flakes, a thickness of 0.015-0.019 inches, is required, using flakes prepared in accordance with this invention, as compared to the traditional instant flake thicknesses in the range 0.011-0.014", using the raw flakes prepared by conventional processes. For "Quick" type oat flakes, 0.020-0.024 inches is preferred, using flakes prepared in accordance with this invention, as compared traditionally prepared "Quick" rolled oats which have a thickness of 0.015-0.019. Likewise, to produce a product which a consumer would regard as equivalent to Old Fashioned, in accordance with this invention, the product is flaked to a thickness of 0.025-0.029, instead of the conventional, 0.020-0.024 inch thickness range. "Steam Table Oats" are flaked to thicknesses between 0.030-0.033, with product made in accordance with this invention, whereas thicknesses of between 0.025-0.029 were used in conventional methods of preparation.

HIGH-TEMPERATURE, DRY-AIR GELATINIZATION METHODS

When the high-temperature dry-air methods are used, the toasted grain is then cooled, and sufficient water is added with mixing, to raise moisture to 8-12 percent moisture. This re-hydration is preferably done within 30 minutes of the time that the heating is discontinued, and is independent of, and in addition to, the steaming which can be used in preparation for flaking. The flaking must take place in less than 48 hours, and preferably in less than 24 hours of the completion of the remoisturization step.

If desired, the resulting grain can then be rolled, or flaked, using conventional processing and equipment. For example, the resulting grain may then be steamed at 200-210 degrees F. for 8-10 minutes, (preferred), and then rolled into an appropriate thickness. The specific thickness imparted depends on whether an Instant or Old Fashioned, or some other type flake, is desired, for example.

If employed, the rolling or flaking step must be applied within a 48 hour period of time, more preferably within a 24 hour period of time, from the time of the remoisturization step if the high-temperature dry-air method is being used, or a shelf stable product will not result.

STEAM COOK AND OTHER WET METHODS

As indicated above, the pregelatinization methods can also include steaming methods, and other high moisture pregelatinization methods which result in either partial or complete gelatinization, e.g. in about 10-100% gelatinization, preferably about 80% gelatinization.

This can be accomplished by subjecting the same starting materials, referred to above, with live steam for sufficiently high temperatures, and for sufficiently long periods of time to provide such levels of gelatinization. Alternatively, the grain can be moistened and subjected to sufficiently high temperature, and for sufficiently long periods of time to provide such levels of gelatinization. The examples below include a suggested "wet"

method. Generally speaking, it is a simple straightforward matter to compare the time-temperature conditions for various levels of water in the oat-derived starting material, with the degree of cook, using methods described herein.

DESCRIPTION OF PREFERRED EMBODIMENTS

In the method of the present invention, either whole groats or cut groats are pregelatinized before being flaked/and or further cut for the manufacture of a hot cereal suitable for use in microwave preparation.

The method of gelatinization is not critical, but any method which results in from about 10% to 100% inclusive of the grain's starch being gelatinized, is suitable for use as one of the steps in the combination of steps which constitutes the present invention. The Differential Scanning Calorimeter is a useful instrument for determining the extent to which the grain is cooked.

In the following examples, high-temperature dry-air, short-time, methods are illustrated, as well as steaming methods.

With the dry-air, high-temperature, short-time methods, relatively low levels of pregelatinization, e.g. 10–25%, may be accomplished conveniently, though higher levels, e.g. up to about 50% gelatinization can be achieved without adversely affecting flavor, etc.

However, special precautions must be provided, when using the high-temperature, short-time, dry-air methods, in order to assure that the resulting product will be storage stable. Such high-temperature, short-time, dry-air methods with special precautions, are fully disclosed in, and are the subject matter of our copending, and coassigned patent application Ser. No. 356,865, filed May 23, 1989. Such copending patent application is incorporated by reference herein in its entirety.

For low pregelatinization levels, e.g. 10–25%, and for higher pregelatinization levels, e.g. 25% to 100%, or complete cooking, steaming methods may be utilized.

Hence, in accordance with the present invention, the particular method by which the pregelatinization is accomplished is not critical.

The resulting oat products are then dried, if necessary, and packaged at conventional moisture levels, to provide a packaged cereal product which is especially suitable for microwave cooking, in accordance with the present invention.

In accordance with preferred aspects of the present invention, microwave cooking of the pregelatinized oats for use in accordance with this invention is preferably accomplished with the use of minimal water. For example, levels of water in an amount of about ⅔ cup per ounce of grain, and more preferable in an amount of about ½ cup per ounce of grain, are eminently satisfactory. The resulting mixtures provide convenient, one step, single serving, no foamover cooking in the microwave ovens.

THE DRAWINGS

The drawings consist of a plurality of curves prepared by Differential Scanning Calorimetry, DSC. They also include a plot of DSC values vs. degree of gelatinization. These curves relate to tests which were made for the purpose of determining the degree of gelatinization. (They do not relate to the tests referred to herein using a DSC for the purpose of measuring the stability of the fat in the product.)

By way of summary, drawings of FIG. 1 represents a DSC curve of an ungelatinized oat grain product which is not prepared in accordance with this invention, but rather in accordance with Example 8, herein, and is provided for comparison purposes and for the purpose of illustrating the setting-up of analytical procedures. FIG. 2 represents a DSC curve of product which is prepared using a pregelatinized oat product in accordance with this invention.

It is noted that a 100% cooked product would produce a DSC curve in which the normalized area under the curve is zero. The "Normalized Area" term refers to the area under the curve, corrected to the area which would have been obtained had a specific weight of product been used in the test. The plot of the normalized area data provides a "normalized curve" showing the area under the curve (expressed in square centimeters per milligram of dry sample), against the % gelatinization, and samples of products of the present invention. The latter is presented as FIG. 3. herein.

Hence,

FIG. 3 is a a plot of the Normalized Area Under The DSC Curves vs. % Gelatinization.

When raw cereals are subjected to the DSC test, for the purpose of determining the degree of gelatinization, the tested sample is heated under conditions which provide a constant rate of increase of temperature, for example, 5 Degrees/minute. Initially, all the input heat goes simply to raise the temperature of the sample, and the input heat transfer rate is substantially constant. However, the sample which is not completely gelatinized begins to absorb substantial additional heat when the gelatinization temperature is reached. Hence at this point, in order to provide a constant increase in temperature, sufficient additional heat must be applied both to raise the temperature AND to gelatinize the sample. This causes an increase in the heat input (in order to maintain the temperature increase rate constant) and the increase in heat input is visualized as a dip under the curve being tracked. The area of the "dip" under the DSC curve is inversely proportional to the extent of gelatinization of the sample going into the test. That is, "raw" oat cereals absorb a relatively large amount of heat, while it is being cooked in the test instrument, and hence the DSC curve shows a relatively large dip below the line which would have prevailed had the sample been completely cooked. Completely cooked grain will need no additional heat to cause gelatinization when the gelatinization temperature is reached, and hence, no additional heat need be supplied. This results in no dip at all at gelatinization temperatures.

Figure 1:
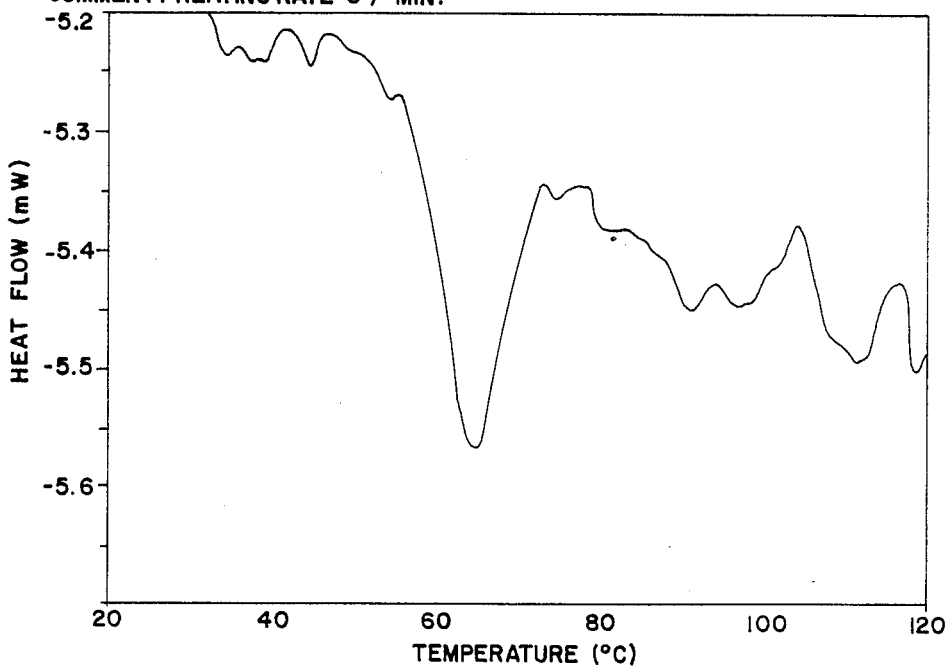
FIG. 1 is a Differential Scanning Calorimetry (DSC) curve obtained using raw steam table oats as a sample.
Figure 2:
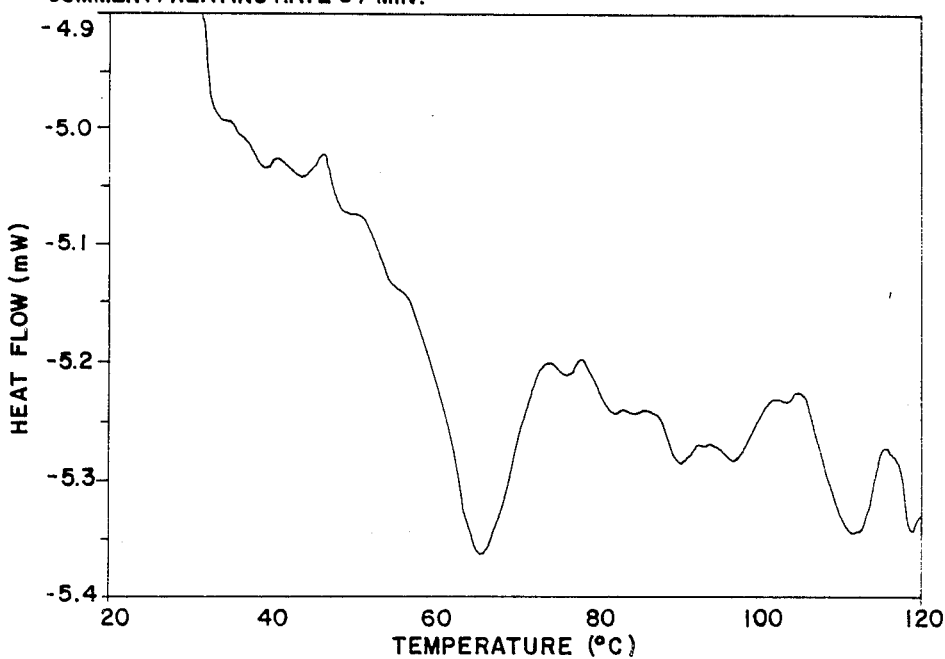
FIG. 2 is a DSC curve obtained using the product of example 1 herein, and in accordance with this invention, as a sample.

The Differential Scanning Calorimetry method is one method by which one with ordinary skill in the art may determine the extent to which the oat grain, processed in accordance with this invention, is gelatinized. Referring to the drawings, FIG. 1 represents the DSC curve obtained using a sample of raw, uncooked Steam Table Oats. It is noted that there is a major "dip" in the curve beginning in mid-fifty degrees area, peaking at about 63 degrees and continuing to about 70 degrees.

The area of this dip, sometimes referred to as the area under the DSC curve, being proportional to the amount of heat necessary to gelatinize the sample, is also proportional to the amount of sample used. (When testing a fully cooked sample, the area under the DSC curve is zero, because no additional heat is needed to cook the already fully cooked sample.)

Therefore, instead of using the actual area under the DSC curve, it is more meaningful to first measure this area under the curve, and then to calculate, or to convert the area to a theoretical area which would have been obtained from some standard weight of sample, i.e. to the area which would have been obtained from the use of some "normal" weight of sample. This is done by dividing the area by the actual weight of the sample. The resulting "normalized" data is then entered on a graph to obtain the plot of the "Normalized Area Under The Curve vs. % Gelatinization", such as that shown in FIG. 3.

Hence, by plotting the normalized area under the curve for a raw sample, (0% Gelatinization) to obtain a point at one end of a line, and by using as a second end point located at the zero area under the DSC curve at 100% gelatinization, and by drawing a line between these two points, one obtains a line similar to that of FIG. 3, herein. Hence, knowing the weight of the sample, and having measured the area under the DSC curve, using such a Figure, it becomes a simple matter to accurately estimate the percent gelatinization of a cooked, or partially cooked oat sample. For example, using the DSC method, one simply determines the normalized area under the DSC curve for a particular sample, and locates the % gelatinization from the Figure similar to FIG. 3 which corresponds to that experimentally determined normalized area under the DSC curve for the sample.

EXAMPLES

The method of this invention is further illustrated by the following Examples, in which all parts are in parts by weight, all percentages are in percent by weight based on the weight of the material or mixture then being referred to, and all temperatures are expressed in degrees Fahrenheit, unless otherwise referred to. Whenever ranges are given, it is intended that the ranges be inclusive, unless otherwise noted. Also, as used herein, the word "cereal" may refer to a grain itself, or to the admixture of the processed grain or grain component in water or milk. The latter, in some other English-speaking countries may also be referred to as "porridge." Which meaning of the word "cereal" is intended will be clear, in each instance, from the context.

As stated above, in Examples 1–4, dry-air, high-temperature methods of pregelatinization are illustrated, and in examples 5–7, methods utilizing steam are illustrated.

EXAMPLE 1

Whole A-grade Groats having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed.

The resulting toasted grain is discharged from the fluidized bed, onto a circulating air conveyer screen. At this point, the resulting grain was found to have a moisture content of 5%, and was found by Differential Scanning Calorimeter studies to be about 19% cooked. The grain was cooled by ambient temperature air. The cooled grain is transferred to a mixer, and sufficient water was added immediately, with mixing, to raise the moisture of the mass to 8–12 percent moisture. This re-addition of water was done within 15 minutes of the time that the heating was discontinued.

Within about 20 hours of the time of the addition of water, the grain is flaked in a conventional process. In such a method, for example, the grain is first contacted with live steam at 200–220 degrees for about 9 minutes, and the grain is then subjected to the action of conventional grain rollers, and is rolled to a thickness of about 0.030 inches. The resulting flakes are re-dried to a moisture level of about 9–12%, packaged, and stored.

This product is equivalent in after-consumer-cook performance characteristics to what is called "Steam-Table Oats" in the trade. (However, it is considerably thicker than the flakes which would produce the "steam table" type characteristics if conventional flakes were to be used.) The "steam table" type oat flakes would be used primarily by restaurants and other institutions which need to keep the oats "consumer ready" for long periods of time. However, many people like oatmeals with pronounced flaky characteristics, and this type product is eminently satisfactory for use in microwave for individual serving, for single serving service for immediate consumption, as well.

A portion of the resulting cereal product is cooked in a microwave oven, using the following method: ⅔ cup of water is admixed with an ounce of the pregelatinized oat product of this example, in a standard 16 ounce bowl, and the mixture is placed in a microwave oven. The oven is operated on high power, set for a 3.0 minute cycle. No foam-over occurs during the microwave cooking.

The resulting product is found to be ready for consumption. However, the amount of water used above in this example, though heretofore regarded to be the at the "usual" water/oats ratio, was perceived to result in a porridge which had more water than what was apparently necessary, in view of the free water remaining in the mixture after the cook. In fact, rather than providing the aqueous phase with a creamy consistency, the aqueous phase of the resulting microwave cooked cereal was somewhat watery.

Hence, the consumer-preparation microwave cooking cycle was repeated, this time with only ½ cup of water, instead, and the resulting product was judged as having excellent textural qualities. No foam-over was encountered in the microwave during either of the last mentioned microwave cooking process. Texture and flavor of this porridge product is substantially identical to that obtained using conventional Steam Table Oats. (However, normally, oat flakes at Steam Table Oats' thickness would take from 10 to 15 minutes to cook, and would be extremely likely to boil over in the microwave.)

EXAMPLE 2

Oat groats are steel-cut in the well known, conventional manner. These groats, having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient air flow to maintain the fluidized condition of the grain bed.

The resulting toasted grain is discharged from the fluidized bed, onto a circulating air conveyer screen. At this point, the resulting grain is found to have a moisture content of 5%, and is found by Differential Scanning Calorimeter studies to be about 20% cooked, using the method described above, and used in connection with Example 1, herein. The grain was cooled by ambient temperature air. The cooled grain is transferred to a mixer, and sufficient water was added immediately, with mixing, to raise the moisture to 8-12 percent moisture. This hydration was done within 15 minutes of the time that the heating was discontinued.

Within about 5 hours of the time of the addition of water, the resulting grain is flaked. In preparation for flaking, the grain is steamed by being subjected to live steam at 200-220 degrees for about 9 minutes, and the grain is then subjected to the action of conventional grain rollers, and is rolled to a thickness of about 0.018 inches. The resulting flakes are dried to a moisture of 9-12%, packaged and stored.

The product of this example is equivalent, in thickness, to that of conventional "Quick" oats, but in performance, it is equivalent to "Instant" oats.

A portion of the cereal product of this Example is cooked in a microwave oven, using the following method: ⅔ cup of water is admixed with an ounce of the pregelatinized oat product of this example, in a standard 16 ounce bowl, and the mixture is placed in a microwave oven. The oven is operated on high power, set for a 2.0 minute cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product is substantially identical to that of Quick Oats which was prepared on the stove top. Moreover, when tested in a taste panel, the product of this example was rated preferred over instant oats which was prepared in accordance with package directions. (Normally, Quick Oats would take from 2 to 2.5 minutes to cook when prepared on the stove top.)

Another portion of the product made in accordance with this example is consumer-prepared in a one step "INSTANT" method, using the following procedure: One ounce of the cereal product of this example is admixed with ½ cup of boiling water, left to sit for 1 minute, or more if desired, as in the standard instant oatmeal directions. The texture and flavor of the resulting product is better, being more flaky, and less pasty, than the widely available instant oatmeal, prepared in accordance with package directions.

EXAMPLE 3

This example is similar to Example 1, except that the groats used in this test were steel-cut.

Oat groats are steel-cut in the well known, conventional manner. These groats, having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed.

The resulting toasted grain is discharged from the fluidized bed, onto a circulating air conveyer screen. At this point, the resulting grain was found to have a moisture content of 5%, and was found by Differential Scanning Calorimeter studies to be about 20% cooked. The grain was cooled by ambient temperature air. The cooled grain is transferred to a mixer, and sufficient water was added immediately with mixing, to raise the moisture to 8-12 percent moisture. This hydration was done within 15 minutes of the time that the heating was discontinued.

Within about 5 hours of the time of the addition of water, the resulting grain is flaked. In preparation for flaking, the grain is steamed by being subjected to live steam at 200-220 degrees for about 9 minutes, and the grain is then subjected to the action of conventional grain rollers, and is rolled to a thickness of about 0.030 inches.

A portion of the resulting cereal product is cooked in a microwave oven, using the following method: ⅔ cup of water is admixed with an ounce of the pregelatinized oat product, in a standard 16 ounce bowl, and the mixture is placed in a microwave oven. The oven is operated on high power, set for a 3 minute cycle. No foam-over is observed during this heating cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product is substantially identical to that of Steel-Cut Oatmeal which was prepared on the stove top in accordance with package directions.

EXAMPLE 4

Oat groats are steel-cut in the well known, conventional manner. These groats, having a moisture level of about 14% are charged to a fluidized bed of groats in a Jet-zone (TM) oven, and toasted in a stream of high-temperature air at temperatures of about 500 degrees Fahrenheit, for about 60 seconds, with sufficient airflow to maintain the fluidized condition of the grain bed.

The resulting toasted grain is discharged from the fluidized bed, onto a circulating air conveyer screen. At this point, the resulting grain was found to have a moisture content of 5%, and was found by Differential Scanning Calorimeter studies to be about 20% cooked. The grain was cooled by ambient temperature air. The cooled grain is transferred to a mixer, and sufficient water was added immediately with mixing, to raise the moisture to 8-12 percent moisture. This hydration was done within 15 minutes of the time that the heating was discontinued.

Within about 5 hours of the time of the addition of water, the grain flaked. In preparation for flaking, the grain is steamed by being subjected to live steam at 200-220 degrees for about 9 minutes, and the grain is then subjected to the action of conventional grain rollers, and is rolled to a thickness of about 0.024 inches.

A portion of the resulting cereal product is cooked in a microwave oven, using the following method: ⅔ cup of water is admixed with an ounce of the pregelatinized oat product, in a standard 16 ounce bowl, and the mixture is placed in a microwave oven. The oven is operated on high power, set for a 2 minute cycle. The resulting product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. Texture and flavor of this product is substantially identical to that of Old Fashioned oatmeal, sometimes called "Regular" oatmeal, which would have taken from 5–6 minutes of cooking, using normal package directions.

EXAMPLE 5

This example illustrates a steaming method for the pregelatinization of oat groats, in the manufacture of a hot cereal particularly suitable for preparation in a microwave cooking method.

Oat groats are steel-cut in the well known, conventional manner. They are then subjected to the action of live steam at 280 degrees Fahrenheit, at 50 PSI for five minutes. This period of time is sufficient for the starch in the groats to be about 80% gelatinized, based on the findings of a Differential Scanning Calorimeter, using the methods described above.

The resulting grain has a moisture content of about 20–30%, and it is dried down to a moisture level of about 11%, which is conventional for packaged hot cereal products.

The resulting pre-cooked grain was cut-milled to pass thru a U.S. 12, and to remain on a U.S. 30 screen. The resulting milled grain is packaged and stored. It is found to have a shelf life of at least 6 months.

A portion of the resulting cereal product is cooked in a microwave oven, using the following method: ⅔ cup of water is admixed with an ounce of the pregelatinized oat product of this example, in a standard 16 ounce bowl, and the mixture is placed in a microwave oven. The oven is operated on high power, with a three minute cycle setting. The resulting cooked product is found to be ready for consumption, but is deemed to have more water than is necessary. A repeat cook test is carried out using the procedure of this example, except that only ½ cup of water is used. The resulting cooked microwave product is judged as having excellent textural qualities, after this heating cycle. No foam-over was encountered in the microwave during the last-mentioned cooking process, either. The resulting product was judged as having excellent flavor and textural qualities, after the heating cycle, and no foam-over was encountered in the microwave during the process. The product has a texture and flavor substantially identical to that of steel-cut oatmeal, when cooked. (Steel-cut oatmeal normally requires overnight soaking and 20–30 minute cooking time.)

EXAMPLE 6

This example illustrates the use of a steaming method for the pregelatinization of oat groats, in the manufacture of a hot flaked cereal particularly suitable for consumer-preparation in a microwave cooking method, in accordance with this invention.

Whole A-grade groats, having a moisture level of about 10% are used as starting material. They are subjected to the action of live steam at 50 PSI at 280 degrees Fahrenheit, for five minutes. This period of time is sufficient for the starch in the groats to be about 80% gelatinized, based on the findings of a Differential Scanning Calorimeter.

The resulting grain has a moisture content of about 20–30%, and it is dried down to a moisture level of about 11%.

The resulting pre-cooked grain was flaked in an otherwise conventional process involving the steps of subjecting the pre-cooked grain to the action of live steam (which brings the moisture level back up to about 14–18%) and flaking the steamed grain to a thickness of 0.045 inches. The resulting flaked grain is packaged and stored. It is found to have a shelf life of at least 6 months.

A portion of the resulting cereal product is cooked in a microwave oven, using the following method: ½ cup of water is admixed with an ounce of the pregelatinized oat product of this Example, in a standard 16 ounce bowl, and the mixture is placed in a microwave oven. The oven is operated on high power for a 3.5 minute cycle. After the heating cycle, the resulting cooked product is found to be ready for consumption, having excellent textural qualities. No foam-over was encountered in the microwave during the process. (In similar preparation using a 12 ounce bowl, no foam over was encountered.) The cereal has a texture and flavor substantially identical to that of Old Fashioned oatmeal, when microwave cooked.

EXAMPLE 7

Oat bran is produced in accordance with well-known, published, conventional methods. (The method used in this Example, is the method published in "Oats, Chemistry and Technology," published by the American Association of Cereal Chemists, Inc, Francis Webster, editor, (1986), see page 317.)

In accordance with the published method, clean, dehulled, oat groats are steamed, and flaked, and ground, and the resulting material is sifted, and air classified to produce a coarse oat fraction known in the industry as oat bran.

In accordance with the present invention, the resulting oat bran is subjected to the action of live steam at 50 PSI at 280 degrees Fahrenheit for 5 minutes, and is then dried to about 11% moisture, and is reground.

The resulting milled product is packaged and stored. It is found to have a shelf life of at least 6 months.

A portion of the resulting cereal product is cooked in a microwave oven, using the following method: ½ cup of water is admixed with an ounce of the pregelatinized oat bran product of this example, in a standard 12 ounce bowl, and the mixture is placed in a microwave oven. The oven is operated on high power, with a two minute cycle setting. The resulting cooked product is found to be ready for consumption, having excellent textural qualities, after the heating cycle, and no foam-over was encountered in the microwave during the process. The porridge product has a texture and flavor substantially identical to that obtained from the use of conventional oat bran when cooked on the stove top.

EXAMPLE 8

This example is for the purpose of comparison, only, and does not represent a method of preparation which is in accordance with the present invention. Rather, it represents what is believed to be a common, conventional method of making rolled oats.

A-grade Groats having a moisture level of about 14% are steamed in conventional manner to deactivate enzymes.

The grain is flaked using a conventional flaking process in which it is steamed by being subjected to live steam at about atmospheric pressure at 200–210 degrees for about 9 minutes, raising the moisture level to about 18% and the grain is then subjected to the action of conventional grain rollers, where it is rolled to a thickness of about 0.024 inches.

Upon drying in high temperature air to a moisture level of about 11%, the resulting grain is packaged and stored.

This product is found by Differential Scanning Calorimeter to completely uncooked. See FIG. 1.

When subsequently cooked in a microwave oven, using package directions, and a standard 16 ounce bowl, with three quarters of a cup water per ounce of grain flakes, the mixture foamed over before the 5-6 minute cook cycle was completed. In addition, the product, when cooked had a very gummy and pasty texture, substantially identical to that of conventional instant oats prepared by using the boiling water method.

DISCUSSION

With respect to the use of the high-temperature, short-time, dry-air cooking method, which is used, in accordance with some embodiments of this invention, to bring the moisture level to within the range of about 3-6%, it should be noted that the time-temperature conditions used in Examples 1-4, above, are illustrative of preferred embodiments only, and that other conditions can be used in order to achieve the degree of cook necessary for the practice of this invention.

For example, temperatures of about 450° Fahrenheit for 70 seconds, or 550° degrees F. for 50 seconds, are also eminently satisfactory for use in accordance with preferred aspects of this invention, and give equally acceptable results as those shown in the Examples. The series of tests utilizing hot air toasting, as described in the above Examples 1-4, and being in accordance with this invention, was done with uniform starting material having a moisture level of about 10-14%. If the starting material has lower or higher initial moisture, slightly shorter or longer times, and/or lower or higher temperatures, are preferred, and such adjustments in cooking conditions are readily determined by simple experimentation.

In order to evaluate the effect of higher levels of gelatinization, using high-temperature, dry-air gelatinization methods, we also made longer time treatment, using high-temperature, dry-air Jetzone runs, to achieve up to about 50% gelatinization. Above this level we got some burning of the product in the Jetzone cooker, and hence, for higher levels of gelatinization, we resorted to the steaming methods.

After the high-temperature, short-time dry cooking step in accordance with this invention, by observation of the Maltese Crosses, and by observation of the areas under the DSC (Differential Scanning Calorimetry) curves, it is estimated that between 10-45% gelatinization has been accomplished when preferred conditions are employed in the heat treatment step.

We have found that the use of grains having initial moisture levels in the range of 8%-20% are eminently satisfactory, for example, and our tests indicate that grains having initial moistures even higher give satisfactory results.

The illustrative steaming methods referred to in the above Examples 5, and 6, are merely the presently preferred steaming time-temperature conditions for the starting materials having the specified moisture levels. Steaming can take place at elevated pressures, such as, for example, 25-100 PSI. In addition, other cooking temperature conditions, such as, for example, the use of 300 Degrees F. for 2 minutes, or 260 Degrees F. for 10 minutes, etc., are eminently satisfactory for use in the method of this invention. Again, suitable time-temperature conditions to provide a desired degree of gelatinization are readily determined using simple experimentation.

The qualities of the product, whether cooked to the 10-25% gelatinization range, or whether cooked to the 80-100% range, or in between, are found to be substantially identical. Only the availability of equipment, or other economic factors would militate for the use of one method over the other.

We claim:

1. A method for the preparation of a hot oat cereal in a microwave oven, comprising the steps: pregelatinizing oat groats to a level of between about 10% and 100% gelatinization, inclusive; adjusting the moisture level, if necessary for shelf storage; packaging the resulting product to provide a dry, packaged product; admixing at least a portion of the resulting product with water; and subjecting the resulting admixture to a cook cycle in a microwave oven.

2. The method of claim 1 in which said amount of water is an amount sufficient to provide about ⅜ cup of water or less per ounce of packaged product.

3. The method of claim 1 in which the amount of water is an amount sufficient to provide ½ cup or less of water per ounce of dry, packaged cereal.

4. In a process for providing a hot oat cereal wherein oat groats are flaked or otherwise deformed, packaged for storage at a suitable moisture level, subsequently removed from the package, admixed with water and cooked in a microwave oven with resultant foaming; the improvement which comprises reducing said foaming by first subjecting said groats to conditions which are sufficient to at least partially gelatinize the starch in the groats.

5. The process of claim 4 wherein 10% to 100% of the starch of said groats is gelatinized, as determined by Differential Scanning Colorimetry.

6. The process of claim 4 wherein said gelatinization occurs as the result of subjecting the oat groats to the action of live steam.

7. The process of claim 4 in which the flaking step is under sufficient pressure, and with an appropriate gap to provide flakes having a thickness between about 0.030-0.060 inches.

* * * * *